(12) United States Patent
Ichinose et al.

(10) Patent No.: US 9,096,723 B2
(45) Date of Patent: Aug. 4, 2015

(54) PRODUCTION PROCESS OF POLY(ARYLENE SULFIDE) AND POLY(ARYLENE SULFIDE)

(75) Inventors: Yoshihiro Ichinose, Tokyo (JP); Masanori Kobayashi, Tokyo (JP); Takayuki Kimura, Tokyo (JP); Koichi Suzuki, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 35 days.

(21) Appl. No.: 13/989,714

(22) PCT Filed: Oct. 18, 2011

(86) PCT No.: PCT/JP2011/073939
§ 371 (c)(1),
(2), (4) Date: May 24, 2013

(87) PCT Pub. No.: WO2012/070335
PCT Pub. Date: May 31, 2012

(65) Prior Publication Data
US 2013/0253147 A1    Sep. 26, 2013

(30) Foreign Application Priority Data
Nov. 26, 2010 (JP) ................................ 2010-264299

(51) Int. Cl.
*C08G 75/16* (2006.01)
*C08G 75/02* (2006.01)

(52) U.S. Cl.
CPC ............... *C08G 75/16* (2013.01); *C08G 75/02* (2013.01)

(58) Field of Classification Search
CPC .................................................... C08G 75/02
USPC ......... 528/379, 381, 388, 488, 489, 492, 493, 528/495, 499, 501, 503
See application file for complete search history.

(56) References Cited

U.S. PATENT DOCUMENTS

| | | | |
|---|---|---|---|
| 4,814,430 A | 3/1989 | Iwasaki et al. | |
| 5,108,823 A | 4/1992 | Sirinyan et al. | |
| 5,206,439 A | 4/1993 | Shaw | |
| 5,496,917 A | 3/1996 | Fleischer et al. | |
| 6,013,761 A | 1/2000 | Zierer et al. | |
| 8,183,336 B2* | 5/2012 | Sato et al. | 528/379 |
| 2006/0052578 A1 | 3/2006 | Higuchi et al. | |
| 2006/0086374 A1 | 4/2006 | Sato et al. | |
| 2007/0093642 A1 | 4/2007 | Sato et al. | |
| 2007/0161777 A1 | 7/2007 | Sato et al. | |
| 2012/0065361 A1 | 3/2012 | Konno et al. | |

FOREIGN PATENT DOCUMENTS

| | | |
|---|---|---|
| JP | 59-168032 A | 9/1984 |
| JP | 62-253626 A | 11/1987 |
| JP | 2-232375 A | 9/1990 |
| JP | 4-218531 A | 8/1992 |
| JP | 5-255235 A | 10/1993 |
| JP | 7-003024 A | 1/1995 |
| JP | 8-134216 A | 5/1996 |
| JP | 11-169870 A | 6/1999 |
| JP | 11-228696 A | 8/1999 |
| JP | 2003-275773 A | 9/2003 |
| JP | 2004-182840 A | 7/2004 |
| JP | 2005-194312 A | 7/2005 |
| JP | 2005-225931 A | 8/2005 |
| JP | 2009-79317 A | 4/2009 |
| WO | 2004-060973 A | 7/2004 |
| WO | 2010134445 A1 | 11/2010 |

OTHER PUBLICATIONS

U.S. Appl. No. 13/698,600 claims.*
Office Action from corresponding Chinese Application 201180056570.7, dated Apr. 18, 2014.
Japanese Office Action, dated Apr. 14, 2015, for Japanese Application No. 2012-545655, with an English translation thereof.

* cited by examiner

*Primary Examiner* — Duc Truong
(74) *Attorney, Agent, or Firm* — Birch, Stewart, Kolasch & Birch, LLP

(57) ABSTRACT

A production process of a poly(arylene sulfide), including (a) a polymerization step of polymerizing at least one sulfur source selected from the group consisting of alkali metal sulfides and alkali metal hydrosulfides and a dihalo-aromatic compound in an organic amide solvent to form a polymer; (b) a separation step of separating the polymer from a liquid reaction mixture containing the polymer formed after the polymerization step; (c) a washing step of washing the polymer with at least one washing liquid selected from the group consisting of water, an organic solvent and a mixed solution of water and an organic solvent as desired; and (d) an aqueous oxidizing solution treatment step of treating the polymer by bringing the polymer into contact with an aqueous oxidizing solution.

16 Claims, No Drawings

PRODUCTION PROCESS OF POLY(ARYLENE SULFIDE) AND POLY(ARYLENE SULFIDE)

TECHNICAL FIELD

The present invention relates to a production process of a poly(arylene sulfide), by which occurrence of offensive odor is little upon production thereof and upon molding or forming and processing thereof, said process comprising bringing a formed polymer separated and collected from a liquid reaction mixture after a polymerization reaction into contact with an aqueous oxidizing solution upon production of the poly (arylene sulfide), or treating a liquid containing an organic amide solvent after the formed polymer is separated from the liquid polymerization reaction mixture or a washing waste liquid after the formed polymer is washed with an organic solvent and/or water with the aqueous oxidizing solution.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical strength, electrical properties, dimensional stability, etc. The PASs are commonly used in a wide variety of technical fields such as electrical equipments, electronic equipments, automotive equipments and packaging materials because they can be molded or formed into various kinds of molded or formed products, films, sheets, fibers, etc. by general melt processing processes such as extrusion, injection molding and compression molding.

As a typical production process of a PAS, is known a process in which a sulfur source is reacted with a dihalo-aromatic compound under heating conditions in an organic amide solvent such as N-methyl-2-pyrrolidone (hereinafter may also be abbreviated as "NMP"). As the sulfur source, is generally used an alkali metal sulfide, an alkali metal hydrosulfide or a mixture thereof. When the alkali metal hydrosulfide is used as the sulfur source, the alkali metal hydrosulfide is used in combination with an alkali metal hydroxide.

Since the polymerization of the PAS is conducted at a high temperature, a secondarily formed sulfur compound from the sulfur source and a decomposition product of the organic amide solvent that is a reaction solvent form the cause of occurrence of offensive odor.

Accordingly, the PAS formed by the polymerization is cleaned by, for example, washing a formed polymer separated from a liquid reaction mixture containing it with water, an organic solvent or a mixed solution of water and an organic solvent. However, the occurrence of offensive odor upon production of the PAS and upon molding or forming and processing thereof has not been completely inhibited even by such a washing treatment. In particular, when the dihalo-aromatic compound is reacted in an amount exceeding 1.00 mol per mol of the sulfur source, an unreacted dihalo-aromatic compound is taken in a PAS particle, and hydrogen sulfide derived from the sulfur source and a modified compound thereof are formed during a dehydration step or a polymerization reaction step, or a by-product which forms the cause of malodor is produced by a reaction of these compounds with an organic solvent used for washing, so that, in some cases, these may form the cause of occurrence of offensive odor upon production of the PAS or remain in the PAS to form the cause of occurrence of offensive odor upon molding or forming of the PAS.

In addition, since the liquid containing the organic amide solvent after the PAS is separated from the liquid reaction mixture containing the formed polymer or the washing waste liquid after the PAS is washed with the organic solvent or the like contains unreacted raw materials, a secondarily formed sulfur compound from the sulfur source and decomposition products of the organic amide solvent which is a reaction solvent and the organic solvent used in the washing which form the cause of occurrence of offensive odor, it has taken a lot of time and labor to conduct a deodorizing treatment for such a liquid to prevent the organic amide solvent or the like from recycling and reusing.

Thus, Japanese Patent Application Laid-Open No. 8-134216 (Patent Literature 1) has proposed a process for producing a PAS hard to cause corrosion of a mold upon molding by adding and reacting a 1,3-dihalobenzene after a reaction of a sulfide with a 1,4-dihalobenzene is substantially completed, thereby reducing an amount of a sulfur-containing gas produced upon heating and melting. Japanese Patent Application Laid-Open No. 2004-182840 (Patent Literature 2; corresponding to U.S. Patent Application Publication No. 2006/0052578) has proposed a production process of a PAS by keeping an NMP solution of a PAS after a polymerization reaction at 230 to 290° C. to conduct washing in a molten state and adding a silane coupling agent after the washing to conduct melt-kneading, thereby reducing a disulfide structure or a thiol structure in a resin.

Japanese Patent Application Laid-Open No. 2005-194312 (Patent Literature 3; corresponding to U.S. Patent Application Publication No. 2007/0161777) has proposed a production process of a PAS by washing a PAS obtained by polymerization with a hydrophilic organic solvent, such as acetone, containing 1 to 30% by mass of water to reduce a nitrogen content to 50 ppm or less based on the mass of the polymer, thereby markedly reducing a deposit on a mold or die upon melt-molding. Japanese Patent Application Laid-Open No. 2005-225931 (Patent Literature 4; corresponding to U.S. Patent Application Publication No. 2007/0093642) has proposed a production process of a PAS high in whiteness degree and excellent in melt stability by washing a polymer formed in a polymerization step with washing liquid composed of water, a hydrophilic organic solvent such as acetone or a mixed solution thereof repeatedly and then washing it with water or the mixed solution at a final stage to control a pH, thereby removing an organic amide solvent, an alkali metal halide, an oligomer, a decomposed product, etc. which are adhered to the PAS after a separation treatment. International Publication No. 2004/060973 (Patent Literature 5; corresponding to U.S. Patent Application Publication No. 2006/0086374) has proposed a production process of a PAS by washing a polymer separated from a liquid reaction mixture with an organic solvent such as acetone and then adding an inorganic acid such as hydrochloric acid to the organic solvent recovered to conduct distillation, thereby reducing the content of an alkaline compound such as methylamine.

According to all the inventions of Patent Literatures 1 to 5, however, the occurrence of offensive odor upon the production of the PAS and upon molding and processing thereof has been unable to be completely inhibited. When an organic solvent has been used for washing in particular, odor upon the production or odor upon the molding which is considered to be caused by a reaction product of hydrogen sulfide or a derivative thereof generated during a polymerization reaction with the organic solvent has been unable to be avoided. In addition, it has taken a lot of time and labor to conduct the deodorizing treatment for the remaining raw materials which are contained in the liquid containing the organic amide solvent after the PAS is separated from the liquid reaction mixture or the washing waste liquid after the PAS is washed with the organic solvent, and the secondarily formed sulfur compound from the raw material source and decomposition products of the organic amide solvent which is the reaction solvent and the organic solvent used in the washing which form the cause of occurrence of offensive odor.

On the other hand, Japanese Patent Application Laid-Open No. 11-228696 (Patent Literature 6; corresponding to U.S. Pat. No. 6,013,761) has proposed a production process of a poly(arylene sulfoxide) by weighing and pouring a hydrogen peroxide solution having a concentration of 30 to 100% into a PAS suspended in concentrated sulfuric acid to oxidize the PAS. Japanese Patent Application Laid-Open No. 2009-79317 (Patent Literature 7) has proposed a production process of paper composed of a PPS oxide (PPSO) by dispersing fine powder of PPS and short fiber of PPS in water, making paper from the resultant paper stock and then subjecting the resultant paper to a oxidation reaction treatment in the presence of a liquid containing 0.1 to 20% by mass of an oxidizing agent selected from an inorganic salt peroxide and aqueous hydrogen peroxide. Japanese Patent Application Laid-Open No. 7-3024 (Patent Literature 8; corresponding to U.S. Pat. No. 5,496,917) has proposed a two-stage oxidation method for a PAS by oxidizing a solid polymer in a suspension medium with ozone and reacting the resultant reaction product with hydrogen peroxide used in the form of an aqueous solution having a concentration of 30% in the presence of a catalytic amount of concentrated sulfuric acid in acetic acid.

However, the inventions of Patent Literatures 6 to 8 are directed to the production of the poly(arylene sulfoxide) or PPSO by oxidizing and modifying the PAS and not to a process for producing a PAS. Accordingly, according to such an invention, it has been impossible to produce a PAS that is an engineering plastic excellent in heat resistance, chemical resistance, flame retardancy, mechanical strength, electrical properties, dimensional stability, etc. and can be commonly used in a wide variety of technical fields such as electrical equipments, electronic equipments, automotive equipments and packaging materials by utilizing the property of the PAS that can be molded or formed into various kinds of molded or formed products, films, sheets, fibers, etc. by general melt processing processes such as extrusion, injection molding and compression molding. In addition, the inventions has involved a problem that since hydrogen peroxide or the like is used at a high concentration for oxidizing and modifying the PAS, it takes a lot of cost for a treatment step thereof or a post treatment for making hydrogen peroxide or the like remaining in a waste liquid after the treatment harmless.

CITATION LIST

Patent Literature

Patent Literature 1: Japanese Patent Application Laid-Open No. 8-134216
Patent Literature 2: Japanese Patent Application Laid-Open No. 2004-182840
Patent Literature 3: Japanese Patent Application Laid-Open No. 2005-194312
Patent Literature 4: Japanese Patent Application Laid-Open No. 2005-225931
Patent Literature 5: International Publication No. 2004/060973
Patent Literature 6: Japanese Patent Application Laid-Open No. 11-228696
Patent Literature 7: Japanese Patent Application Laid-Open No. 2009-79317
Patent Literature 8: Japanese Patent Application Laid-Open No. 7-3024

SUMMARY OF INVENTION

Technical Problem

It is an object of the present invention to provide a production process of a PAS, by which occurrence of offensive odor upon production thereof is reduced, and occurrence of offensive odor from the PAS upon processing is reduced, and a PAS obtained by the production process.

Another object of the present invention is to remove by-products or the like remaining or produced during production of a PAS and when a polymer separated and collected from a liquid reaction mixture after a polymerization step of the PAS is washed with an organic solvent to reduce offensive odor occurred from the polymer upon molding and processing thereof.

A further object of the present invention is to reduce offensive odor of a liquid after a PAS is separated from a liquid reaction mixture and a washing waste liquid after the PAS is washed with an organic solvent.

The present inventors have carried out an extensive investigation with a view toward achieving the above objects. As a result, it has been found that an odor-causing substance remaining or produced upon production of a PAS and upon washing or collecting thereof with an organic solvent is removed by a contact treatment with an aqueous oxidizing solution, whereby offensive odor occurred upon the production of the PAS and upon molding or forming and processing thereof can be reduced. In addition, the present inventors have found that the present invention particularly has an effect when an organic solvent such as acetone is used as a washing solvent for the PAS after polymerization.

Solution to Problem

According to the present invention, there is provided a production process of a poly(arylene sulfide), comprising the following steps (a), (b) and (d) or (a) to (d):
(a) a polymerization step of subjecting at least one sulfur source selected from the group consisting of alkali metal sulfides and alkali metal hydrosulfides and a dihalo-aromatic compound to a polymerization reaction in an organic amide solvent to form a polymer;
(b) a separation step of separating and collecting the polymer from a liquid reaction mixture containing the polymer formed after the polymerization step;
(c) a washing step of washing the polymer collected with at least one washing liquid selected from the group consisting of water, an organic solvent and a mixed solution of water and an organic solvent and then separating and collecting the polymer; and
(d) an aqueous oxidizing solution treatment step of treating the polymer collected by bringing the polymer into contact with an aqueous oxidizing solution.

According to the present invention, there is also provided a production process of a poly(arylene sulfide), further comprising (e) a separated liquid-treating step of treating at least one separated liquid selected from the group consisting of a liquid after the polymer is separated from the liquid reaction mixture in the separation step and a washing waste liquid after the polymer is separated in the washing step by bringing the liquid into contact with an aqueous oxidizing solution.

According to the present invention, there is further provided a poly(arylene sulfide) produced by any of the above-described production processes, in which the content of mesityl oxide is 65 ppm or less, the content of diacetone alcohol is 35 ppm or less, the content of a dihalo-aromatic compound is 110 ppm or less, or the total content of mesityl oxide and diacetone alcohol is 100 ppm or less.

Advantageous Effects of Invention

According to the production processes of the poly(arylene sulfide) of the present invention, an odor-causing substance remaining or produced when the PAS is separated and collected from the liquid reaction mixture containing the polymer formed and when the PAS after the separation is washed and collected is removed, so that the occurrence of offensive odor upon the production of the PAS and upon the molding or forming and processing thereof at a high temperature can be reduced. As a result, the PASs obtained by the production processes according to the present invention are suitable for application to general melt processing processes such as extrusion, injection molding and compression molding and can be suitably utilized in a wide variety of fields such as electrical and electronic equipments and automotive equipments, including sealing compounds and covering materials for electronic parts.

In addition, according to the production processes of the poly(arylene sulfide) of the present invention, offensive odor of a liquid after the PAS is separated from the liquid reaction mixture containing the polymer formed and a washing waste liquid after the PAS is washed with an organic solvent and/or water can be reduced, so that lots of time and labor are not required for a deodorizing treatment for such a liquid to promote the recycling use of the organic amide solvent, the organic solvent, etc., whereby the present invention can also contribute to solution of resources and environment problems.

DESCRIPTION OF EMBODIMENTS

1. Sulfur Source

In the present invention, at least one sulfur source selected from the group consisting of alkali metal sulfides and alkali metal hydrosulfides is used as a sulfur source. As examples of the alkali metal sulfides, may be mentioned lithium sulfide, sodium sulfide, potassium sulfide, rubidium sulfide, cesium sulfide and mixtures of two or more compounds thereof. As examples of the alkali metal hydrosulfides, may be mentioned lithium hydrosulfide, sodium hydrosulfide, potassium hydrosulfide, rubidium hydrosulfide, cesium hydrosulfide and mixtures of two or more compounds thereof.

The alkali metal sulfide may be used in any form of an anhydride, a hydrate and an aqueous solution. Among these, sodium sulfide and lithium sulfide are preferred in that they are industrially available on the cheap. The alkali metal sulfide is preferably used as an aqueous mixture (i.e., a mixture with water having fluidity) such as an aqueous solution from the viewpoints of processing operation, metering, etc.

The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous solution or an aqueous mixture (i.e., a mixture with water having fluidity) from the viewpoints of processing operation, metering, etc.

The alkali metal sulfide used in the present invention may contain a small amount of an alkali metal hydrosulfide. In this case, the total molar quantity of the alkali metal sulfide and alkali metal hydrosulfide becomes a sulfur source after a dehydration step, i.e., "a charged sulfur source".

The alkali metal hydrosulfide used in the present invention may contain a small amount of an alkali metal sulfide. In this case, the total molar quantity of the alkali metal hydrosulfide and alkali metal sulfide becomes a charged sulfur source after the dehydration step. When the alkali metal sulfide and the alkali metal hydrosulfide are mixed and used in combination, a mixture of both naturally becomes a charged sulfur source.

When the sulfur source contains the alkali metal hydrosulfide, an alkali metal hydroxide is used in combination. Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous solution or aqueous mixture.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide.

2. Dihalo-Aromatic Compound

The dihalo-aromatic compound used in the present invention is a dihalogenated aromatic compound having 2 halogen atoms directly bonded to an aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones. Among these, p-dihalobenzenes, m-dihalobenzenes and mixtures of these both compounds are preferred, and p-dihalobenzenes are more preferred.

The halogen atom means each atom of fluorine, chlorine, bromine and iodine, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 1.00 to 1.10 mol, more preferably 1.00 to 1.09 mol, particularly preferably more than 1.00 mol, but not more than 1.09 mol per mol of the sulfur source (alkali metal sulfide and/or alkali metal hydrosulfide) remaining in the system after the dehydration step. When the charged amount of the dihalo-aromatic compound falls within a range of 1.01 to 1.09 mol, good results can be often yielded. If a molar ratio of the dihalo-aromatic compound charged to the sulfur source is too high, it is difficult to form a high-molecular weight polymer. If the molar ratio of the dihalo-aromatic compound charged to the sulfur source is too low on the other hand, a decomposition reaction is easy to occur, and it is difficult to stably perform a polymerization reaction.

3. Branching or Crosslinking Agent

In order to introduce a branched or crosslinked structure into a formed PAS, a polyhalo-compound (may not be always an aromatic compound), to which at least 3 halogen atoms are bonded, an active hydrogen-containing halogenated aromatic compound, a halogenated aromatic nitro compound or the like may also be used in combination. Preferable examples of the polyhalo-compound as a branching or crosslinking agent include trihalobenzenes.

4. Organic Amide Solvent

In the present invention, an organic amide solvent that is an aprotic polar organic solvent is used as a solvent for a dehydration reaction and a polymerization reaction. The organic amide solvent is preferably stable to an alkali at a high temperature. Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkyl-caprolactam compounds and N,N-dialkylimidazolidinone compounds are preferred, and N-methyl-2-pyrrolidone, N-methyl-ε-caprolactam and 1,3-dialkyl-2-imidazolidinones are particularly preferably used. The amount of the organic amide solvent used in the polymerization reaction in the present invention is generally within a range of 0.1 to 10 kg per mol of the sulfur source.

5. Phase Separation Agent (Polymerization Aid)

In order to promote the polymerization reaction to obtain a PAS having a high polymerization degree in a short period of time, various kinds of phase separation agents (polymerization aids) are preferably used in the present invention. The phase separation agent is a compound that is dissolved in the organic amide solvent by itself or under the coexistence of a small amount of water and has a function of lowering the solubility of the PAS in the organic amide solvent. The phase separation agent itself is a compound that is not a solvent for the PAS.

As the phase separation agent, may be used a compound generally known as a polymerization aid or phase separation agent for the PAS. Specific examples of the phase separation agent include water, organic carboxylic acid metal salts such as carboxylic acid alkali metal salts, organic sulfonic acid metal salts, alkali metal halides such as lithium halides, alkaline earth metal halides, aromatic carboxylic acid alkaline earth metal salts, phosphoric acid alkali metal salts, alcohols and paraffinic hydrocarbons. Among these, water and organic carboxylic acid metal salts are preferred because they are cheap, and water is particularly preferred. The amount of the phase separation agent (polymerization aid) used varies with the kind of the compound used. However, it is generally within a range of 0.01 to 10 mol per mol of the charged sulfur source. When the production process of the present invention includes a phase-separation polymerization step, it is preferable to cause water to exist as the phase separation agent in a proportion of higher than 2.0 mol to not higher than 10.0 mol per mol of the charged sulfur source within the polymerization reaction system. Another phase separation agent such as an organic carboxylic acid metal salt than water is used within a range of preferably 0.01 to 3 mol, more preferably 0.02 to 2 mol, particularly preferably 0.03 to 1 mol per mol of the charged sulfur source. Even when water is used as the phase separation agent, another phase separation agent than water may be used as a polymerization aid in combination from the view point of efficiently conducting phase-separation polymerization.

6. Dehydration Step

A dehydration step is preferably arranged as a preliminary step for a polymerization step to control the amount of water in the reaction system. The dehydration step is performed by a process comprising heating and reacting a mixture containing the organic amide solvent and the alkali metal sulfide, desirably, under an inert gas atmosphere and discharging water outside the system by distillation. When an alkali metal hydrosulfide is used as a sulfur source, the dehydration step is performed by a process comprising heating and reacting a mixture containing the alkali metal hydrosulfide and an alkali metal hydroxide and discharging water outside the system by distillation.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the content of water coexisting in the polymerization reaction system is reduced to generally 0.02 to 2.0 mol, preferably 0.05 to 2.0 mol, more preferably 0.5 to 2.0 mol per mol of the charged sulfur source. As described above, the sulfur source after the dehydration step is called "a charged sulfur source". If the water content has become too low in the dehydration step, water may be added prior to the polymerization step to regulate the water content to a desired value.

When the alkali metal hydrosulfide is used as the sulfur source, a mixture containing the organic amide solvent, the alkali metal hydrosulfide and an alkali metal hydroxide in a proportion of 0.95 to 1.05 mol per mol of the alkali metal hydrosulfide is preferably heated and reacted to discharge at least a part of a distillate containing water from the interior of the system containing the mixture to the exterior of the system.

If a molar ratio of the alkali metal hydroxide to a mole of the alkali metal hydrosulfide in the dehydration step is too low, the amount of a sulfur component (hydrogen sulfide) volatilized off in the dehydration step becomes great, which tends to incur reduction in productivity due to lowering of the amount of the sulfur source or cause abnormal reactions and deterioration of the quality of a PAS formed due to increase of a polysulfide component in the charged sulfur source remaining after the dehydration. If the molar ratio of the alkali metal hydroxide to a mole of the alkali metal hydrosulfide is too high, in some cases, change in properties of the organic amide solvent may be increased, difficulty may be encountered on stably performing the polymerization reaction, or the yield and quality of a PAS formed may be deteriorated. A preferable molar ratio of the alkali metal hydroxide to a mole of the alkali metal hydrosulfide in the dehydration step is 0.97 to 1.04, more preferably 0.98 to 1.03.

In many cases, a small amount of an alkali metal sulfide is contained in the alkali metal hydrosulfide, so that the amount of the sulfur source involves a total of the alkali metal hydrosulfide and the alkali metal sulfide. Even when a small amount of the alkali metal sulfide is mixed in, the molar ratio to the alkali metal hydroxide is calculated out on the basis of the content (analytical value) of the alkali metal hydrosulfide in the present invention to regulate the molar ratio between them.

The charging of the respective raw materials into a reaction vessel in the dehydration step is conducted within a temperature range of generally from ordinary temperature (5 to 35° C.) to 300° C., preferably from ordinary temperature to 200° C. The charging order of the raw materials may be optionally set, and the respective raw materials may be additionally charged in the course of the dehydration process. An organic amide solvent is used as a solvent used in the dehydration step. This solvent is preferably the same as the organic amide solvent used in the polymerization step, and NMP is particularly preferred. The amount of the organic amide solvent used is generally of the order of 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system of both systems.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

7. Charging Step

In the present invention, an alkali metal hydroxide and water may be added to the mixture remaining in the system after the dehydration step as needed. When the alkali metal hydrosulfide is used as the sulfur source in particular, the mixture is desirably adjusted in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol, more preferably more than 1.00 mol, but not more than 1.09 mol per mol of the sulfur source existing in the system after the dehydration step, and the number of moles of water becomes 0.02 to 2.0 mol, preferably 0.05 to 2.0 mol, more preferably 0.5 to 2.0 mol per mol of the charged sulfur source. The amount of the charged sulfur source is calculated out in accordance with an equation, [Charged sulfur source]=[Total moles of sulfur charged]−[Moles of sulfur volatilized off after dehydration].

When hydrogen sulfide is volatilized off in the dehydration step, an alkali metal hydroxide is produced by an equilibrium reaction and comes to remain in the system. Accordingly, it is necessary to exactly grasp the amount of hydrogen sulfide volatilized off to determine a molar ratio of the alkali metal hydroxide to the sulfur source in the charging step.

If the molar ratio of the alkali metal hydroxide to a mole of the charged sulfur source is too high, it is liable to increase change in properties of the organic amide solvent or cause abnormal reactions or decomposition reactions upon polymerization. In addition, the lowering of the yield and quality of a PAS formed is often caused. The molar ratio of the alkali metal hydroxide to a mole of the charged sulfur source is preferably 1.005 to 1.085 mol, more preferably 1.01 to 1.08 mol, particularly preferably 1.015 to 1.075 mol. It is preferable to conduct the polymerization reaction slightly in excess of the alkali metal hydroxide in that the polymerization reaction is stably performed to obtain a high-quality PAS.

In the present invention, the sulfur source in the charging step is decided to be called "a charged sulfur source" for distinguishing it from the sulfur source used in the dehydration step. The reason for it is that the amount of the sulfur source poured into the reaction vessel in the dehydration step is varied by the dehydration step. The charged sulfur source is consumed by a reaction with a dihalo-aromatic compound in the polymerization step. However, the molar quantity of the charged sulfur source is based on a molar quantity in the charging step.

8. Polymerization Step

The polymerization step is conducted by charging a dihalo-aromatic compound into the mixture after completion of the dehydration step and heating the sulfur source and the dihalo-aromatic compound in the organic amide solvent. When a polymerization vessel different from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally 100 to 350° C., preferably 120 to 330° C. When the respective components are charged into the polymerization vessel, no particular limitation is imposed on the order of charging, and the charging is conducted by partially charging both components in small portions or charging both components at a time.

In general, the polymerization reaction is preferably conducted by a two-stage process of a first-stage polymerization step and a second-stage polymerization step at a temperature ranging from 170 to 290° C. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours.

The amount of the organic amide solvent used in the polymerization step is within a range of generally 0.1 to 10 kg, preferably 0.15 to 5 kg per mol of the charged sulfur source existing in the polymerization step. The amount may be changed in the course of the polymerization reaction so far as it falls within this range. The content of the coexisting water upon the beginning of the polymerization reaction is desirably controlled within a range of generally 0.02 to 2.0 mol, preferably 0.05 to 2.0 mol, more preferably 0.5 to 2.0 mol per mol of the charged sulfur source. The content of the coexisting water may be increased in the course of the polymerization reaction.

In the production process according to the present invention, the polymerization reaction in the polymerization step is preferably conducted through at least two-stage polymerization steps comprising:

a first-stage polymerization step of subjecting at least one sulfur source selected from the group consisting of alkali metal sulfides and alkali metal hydrosulfides and a dihalo-aromatic compound to a polymerization reaction in an organic amide solvent to form a polymer in which a conversion of the dihalo-aromatic compound is 80 to 99%; and a second-stage polymerization step of continuing the polymerization reaction in the presence of a phase separation agent in a phase-separated state that a concentrated formed polymer phase and a dilute formed polymer phase are present in a mixed state within the polymerization reaction system.

In the production process according to the present invention, the polymerization reaction in the polymerization step is more preferably conducted through at least two-stage polymerization steps comprising:

a first-stage polymerization step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer in which a conversion of the dihalo-aromatic compound is 80 to 99%; and a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in a phase-separated state that a concentrated formed polymer phase and a dilute formed polymer phase are present in a mixed state within the polymerization reaction system.

As described above, the first-stage polymerization step is a stage that the conversion of the dihalo-aromatic compound has reached 80 to 99%, preferably 85 to 98%, more preferably 90 to 97% after initiation of the polymerization reaction. When the production process includes the phase-separation polymerization step, it means a stage before a liquid phase in the polymerization step becomes a phase-separated state. In the first-stage polymerization step, the phase-separated state does not appear.

The conversion of the dihalo-aromatic compound in the first-stage polymerization step is a value calculated out in accordance with each of the following equations. When the dihalo-aromatic compound (abbreviated as "DHA") is added in excess in terms of a molar ratio to the sulfur source, the conversion is calculated out in accordance with the following equation:

Conversion=[(Charged amount (mol) of DHA)−(Remaining amount (mol) of DHA)]/[(Charged amount (mol) of DHA)−(Excessive amount (mol) of DHA)]×100.

In other case, the conversion is calculated out in accordance with the following equation:

Conversion=[(Charged amount (mol) of DHA)−(Remaining amount (mol) of DHA)]/[(Charged amount (mol) of DHA)]×100.

The amount of the coexisting water in the reaction system in the first-stage polymerization step is within a range of generally 0.02 to 2.0 mol, preferably 0.05 to 2.0 mol, more preferably 0.5 to 2.0 mol, particularly preferably 1.0 to 1.9 mol per mol of the charged sulfur source. The amount of the coexisting water in the first-stage polymerization step may be small. However, undesirable reactions such as decomposition of a PAS formed are easy to occur if the amount of the coexisting water is too small. If the amount of the coexisting water exceeds 2.0 mol, a polymerization rate becomes markedly low, or decomposition of the organic amide solvent and a PAS formed is easy to occur. Thus, such a too small or great amount is not preferable. The polymerization is conducted within a temperature range of 170 to 270° C., preferably 180 to 265° C. If the polymerization temperature is too low, the polymerization rate becomes too slow. If the polymerization temperature is a high temperature exceeding 270° C. on the other hand, decomposition of a PAS formed and the organic amide solvent is easy to occur, and the polymerization degree of the PAS formed becomes extremely low.

In the first-stage polymerization step, it is desirable to form a polymer (prepolymer) having a melt viscosity of generally 0.5 to 30 Pa·s as measured at a temperature of 310° C. and a shear rate of 1,216 sec$^{-1}$.

The second-stage polymerization step in the present invention is not the mere step of fractionating and granulating the polymer formed in the first-stage polymerization step, but a step for increasing the polymerization degree of the polymer.

In the second-stage polymerization step, it is preferable to cause the phase separation agent (polymerization aid) to exist in the polymerization reaction system to continue the polymerization reaction in the phase-separated state that the concentrated formed polymer phase and the dilute formed polymer phase are present in a mixed state. In the production process according to the present invention, the amount of the phase separation agent is within a range of 0.01 to 10 mol, preferably 0.01 to 9.5 mol, more preferably 0.02 to 9 mol per mol of the charged sulfur source. If the amount of the phase separation agent is less than 0.01 mol per mol of the charged sulfur source or exceeds 10 mol, the phase-separated state cannot be sufficiently created, and so a PAS having a high polymerization degree cannot be obtained.

Water is particularly preferably used as the phase separation agent, and in the production process in which water is used by itself, it is preferable to control the amount of water in the polymerization reaction system so as to bring about a state that water exists in a proportion of from higher than 2.0 mol to not higher than 10 mol, preferably from higher than 2.0 mol to not higher than 9 mol, more preferably from 2.1 to 8 mol, particularly preferably from 2.2 to 7 mol per mol of the charged sulfur source. If the amount of the coexisting water in the polymerization reaction system in the second-stage polymerization step is not more than 2.0 mol or more than 10 mol per mol of the charged sulfur source, the polymerization degree of a PAS formed is lowered. It is particularly preferable to conduct the second-stage polymerization in a state that the amount of the coexisting water falls within a range of 2.2 to 7 mol because a PAS having a high polymerization degree is easy to be obtained.

In another preferred embodiment of the production process according to the present invention, water and another phase separation agent than water may be used as the phase separation agent in combination. In this embodiment, the amount of water in the reaction system is controlled within a range of from more than 2.0 to not more than 10 mol per mol of the charged sulfur source, and another phase separation agent than water is preferably caused to exist within a range of 0.01 to 3 mol per mol of the charged sulfur source. Another phase separation agent than water may be selected from organic carboxylic acid metal salts, organic sulfonic acid metal salts, alkali metal halides such as lithium halides, alkaline earth metal halides, aromatic carboxylic acid alkaline earth metal salts, phosphoric acid alkali metal salts, alcohols and paraffinic hydrocarbons.

The polymerization temperature in the second-stage polymerization step is within a range of 245 to 290° C. If the polymerization temperature is lower than 245° C., a PAS having a high polymerization degree is hard to be obtained. If the polymerization temperature exceeds 290° C., there is a possibility that a PAS formed and the organic amide solvent may be decomposed. In particular, a temperature range of 250 to 270° C. is preferred because a PAS having a high polymerization degree is easy to be obtained.

Water may be added at an end stage of the polymerization reaction or upon completion thereof to increase the water content for the purpose of lowering the contents of a secondarily produced alkali metal salt (for example, NaCl) and impurities in the polymer formed or collecting the polymer in the form of granules. The system of the polymerization reaction may be a batch system, a continuous system or a combination of both systems. In the batch-wise polymerization, a system that 2 or more reaction vessels are used may be used, if desired, for the purpose of shortening the polymerization cycle time.

9. Separation Step

In the production process according to the present invention, a treatment for separating and collecting the PAS formed after the polymerization reaction may be conducted by the same method as in a treatment step for separating and collecting a PAS formed after an ordinary polymerization reaction. In the separation step, a product slurry that is a liquid reaction mixture containing the PAS formed after completion of the polymerization reaction is cooled, and the product slurry is diluted with water or the like as needed and then separated by filtration, whereby the formed PAS can be separated and collected from the liquid reaction mixture.

According to the production process of the PAS including the phase-separation polymerization step, a granular PAS can be formed, so that it is preferable to separate the granular PAS from the liquid reaction mixture by a method of sifting the polymer particles by means of a screen because the polymer particles can be easily separated from by-products, oligomers, etc. The PAS particles may also be sifted from the product slurry in a high-temperature state without cooling the slurry to about room temperature.

10. Washing Step

The PAS collected may be subjected to a contact treatment with an aqueous oxidizing solution described below as it is. However, it is more preferable from the viewpoint of enhancing the effect of the contact treatment with the aqueous oxidizing solution to provide a washing step of subjecting the PAS collected to a washing treatment with at least one washing liquid selected from the group consisting of water, an organic solvent and a mixed solution of water and an organic solvent to wash the PAS for lessening a secondarily formed alkali metal salt and oligomers as much as possible.

As the organic solvent used in the washing treatment is preferred the same organic amide solvent as the polymerization solvent, or an organic solvent such as a ketone (for example, acetone) or an alcohol (for example, methanol), and the PAS is washed with the organic solvent. A washing liquid containing acetone is preferred in that it is excellent in an effect to remove impurities (low-molecular weight components) such as oligomers and decomposed products. Acetone is preferred even from the viewpoints of profitability and safety. Acetone is more preferably used as a mixed solution with water. A mixed liquid containing water in a proportion of preferably 1 to 60% by mass, more preferably 1 to 30% by mass, particularly preferably 1 to 20% by mass is preferably used as the mixed solution from the viewpoint of enhancing the removal efficiency of organic impurities such as oligomers and decomposed products.

The washing treatment with the washing liquid is generally performed by mixing and stirring the PAS and the washing liquid, and this treatment is preferably performed plural times, not limited to once. The amount of the washing liquid used in each washing treatment is generally 1 to 15 times, preferably 2 to 10 times, more preferably 3 to 8 times as much as the volume of a theoretical PAS polymer (volume of a PAS polymer from which water and the organic solvent have been removed by drying or the like). The washing time is generally 1 to 120 minutes, preferably 3 to 100 minutes, more preferably 5 to 60 minutes. When the washing treatment is conducted with the organic solvent, a washing treatment with water is preferably performed after the washing treatment, as needed, from the viewpoint of enhancing the removal efficiency of the organic impurities. The washing liquid is separated by means of a screen, centrifugal separator or the like. When filtration is conducted by means of the screen, a wet cake having a liquid content of generally about 30 to 75% by mass, often about 40 to 65% by mass is obtained. A wet cake having a low liquid content may also be provided by means of the centrifugal separator.

The washing treatment is generally conducted at ordinary temperature (10 to 40° C.). However, the treatment may also be conducted at a lower or higher temperature than the ordinary temperature so far as the washing liquid is kept in a liquid state. For example, hot water may be used as the washing liquid for enhancing the detergency of water.

In addition to the washing treatment with at least one washing liquid selected from the group consisting of water, the organic solvent and the mixed solution of water and the organic solvent, acid washing for an end group treatment of the PAS with an inorganic acid (for example, hydrochloric acid), an organic acid (for example, acetic acid) or an aqueous solution of a salt (for example, ammonium chloride) thereof may also be performed before or after the above-described washing treatment.

11. Aqueous Oxidizing Solution Treatment Step

In the present invention, an aqueous oxidizing solution treatment step of treating the PAS collected by bringing the PAS into contact with an aqueous oxidizing solution is performed. The aqueous oxidizing solution treatment step may be performed once or plural times after "9. Separation step" for the PAS separated and collected in "9. Separation step" or for the PAS collected by separating the washing liquid in the course of "10. Washing step" conducted for the PAS separated and collected in "9. Separation step" or after completion thereof.

The aqueous oxidizing solution treatment step is performed by mixing and stirring the PAS separated and collected and an aqueous oxidizing solution. The aqueous oxidizing solution in the present invention means a solution with an oxidizing agent dissolved in water. Examples of the oxidizing agent include inorganic salts such as potassium persulfate, potassium permanganate and sodium hypochlorite, organic peroxides such as peracetic acid and perbenzoic acid, hydrogen peroxide, and ozone. Hydrogen peroxide is particularly preferred because a by-product thereof is water, and so it is unnecessary to purify the polymer.

The amount of the oxidizing agent used is within a range of 0.005 to 50 parts by mass, preferably 0.01 to 35 parts by mass, more preferably 0.025 to 25 parts by mass per 100 parts by mass of the theoretical PAS polymer. If the amount of the oxidizing agent used exceeds 50 parts by mass, there is a possibility that properties of the PAS itself may be changed. If the amount of the oxidizing agent used is less than 0.005 parts by mass, the effect to reduce offensive odor is not achieved. The amount of the oxidizing agent used can be suitably controlled by adjusting the concentration of the oxidizing agent in the aqueous oxidizing solution and the amount of the aqueous oxidizing solution added to the PAS so as to fall within the above range.

The aqueous oxidizing solution is used in the form of an aqueous solution containing the oxidizing agent at a concentration of 10 to 100,000 mg/L, preferably 20 to 70,000 mg/L. If the concentration of the oxidizing agent is too high, the effect to reduce offensive odor is not improved, and change in properties of the PAS itself rather occurs. The too high concentration is hence not preferred. If the concentration of the oxidizing agent is too low on the other hand, the effect to reduce offensive odor becomes insufficient.

When the aqueous oxidizing solution is aqueous hydrogen peroxide in particular, it is generally used in the form of an aqueous solution containing hydrogen peroxide at a concentration of 50 to 50,000 mg/L. If the concentration of the aqueous hydrogen peroxide is too high, the effect to reduce offensive odor is not improved, and change in properties of the PAS itself rather occurs. The too high concentration is hence not preferred. If the concentration of the aqueous hydrogen peroxide is too low on the other hand, the effect to reduce offensive odor becomes insufficient. Thus, the concentration of the aqueous hydrogen peroxide is preferably 50 to 10,000 mg/L, more preferably 100 to 9,000 mg/L. It goes without saying that the amount of hydrogen peroxide used at that time is controlled so as to fall within the above range per 100 parts by weight of the theoretical PAS polymer.

The amount of the aqueous oxidizing solution used in the treatment is controlled according to the concentration of the oxidizing agent used in the aqueous oxidizing solution in such a manner that the mixing or stirring with the PAS is sufficient. If the amount of the aqueous oxidizing solution used in the treatment is too small, the mixing or stirring with the PAS becomes insufficient, and so a contacting or oxidizing effect on the PAS by the aqueous oxidizing solution is not sufficiently achieved, and the effect to reduce offensive odor becomes insufficient. If the amount of the aqueous oxidizing solution used in the treatment is too large on the other hand, there is a possibility of causing such demerits in production process that a treatment apparatus must be enlarged, and it takes a long time to separate and collect the PAS after the treatment.

No particular limitation is imposed on a temperature upon the treatment with the aqueous oxidizing solution. However, it is preferably ordinary temperature (10 to 40° C.).

No particular limitation is imposed on conditions upon the treatment with the aqueous oxidizing solution, and the treatment is preferably conducted generally with a neutral solution. However, the treatment may also be conducted with a weakly acidic solution such as aqueous hydrogen peroxide or an alkaline solution.

The time of the treatment with the aqueous oxidizing solution is from 1 minute to 3 hours. If the treatment time is too short, the effect to reduce offensive odor becomes insufficient. If the treatment time is too long on the other hand, the effect to reduce offensive odor is not improved, and there is a possibility that change in properties of the PAS itself may rather occur. The too long time is hence not preferred. Thus, the treatment time is preferably from 3 minutes to 1 hour, particularly preferably 5 to 30 minutes.

12. Formed Polymer Collecting Step

The PAS polymer is separated by filtration after washing the polymer with water or without conducting the washing after the aqueous oxidizing solution treatment step. Thereafter, the polymer is dried to collect the formed PAS polymer.

13. Separated Liquid-Treating Step with Aqueous Oxidizing Solution

In the present invention, a separated liquid-treating step of treating at least one separated liquid selected from the group consisting of a liquid after the polymer is separated from the liquid polymerization reaction mixture in the separation step and a washing waste liquid after the polymer is separated in the washing step by bringing the liquid into contact with an aqueous oxidizing solution, that is, a separated liquid-treating step with the aqueous oxidizing solution, may be further performed.

The separated liquid-treating step with the aqueous oxidizing solution is performed by adding the aqueous oxidizing solution to a separated liquid such as the liquid containing the organic amide solvent after the formed polymer is separated from the liquid polymerization reaction mixture or the washing waste liquid to mix and stir them for a predetermined period of time, leave them at rest for a predetermined period of time or conduct the mixing and stirring and the leaving at rest in combination for a predetermined period of time. The content of an odorous component in the separated liquid can be lowered by going through this separated liquid-treating step with the aqueous oxidizing solution. For example, the content of mesityl oxide that is an odorous component can be reduced to 200 ppm or less, preferably 170 ppm or less based on the total amount of a mixed liquid of the separated liquid and the aqueous oxidizing solution, the content of diacetone alcohol that is an odorous component likewise can be reduced to 200 ppm or less, preferably 150 ppm or less, more preferably 130 ppm or less, and the content of a dihalo-aromatic compound that is an odorous component likewise can be reduced to 60 ppm or less, preferably 50 ppm or less. When the odorous component includes mesityl oxide and diacetone alcohol, the total content thereof can be reduced to 400 ppm or less, preferably 350 ppm or less, more preferably 300 ppm or less based on the total amount of the mixed liquid of the separated liquid and the aqueous oxidizing solution.

The treatment for the separated liquid with the aqueous oxidizing solution may be performed at an optional time so far as the time is on and after "9. Separation step". For example, the treatment for the separated liquid with the aqueous oxidizing solution may be promptly conducted for the liquid containing the organic amide solvent after the PAS is separated by filtration in "9. Separation step". The treatment for the separated liquid with the aqueous oxidizing solution may also be promptly conducted for the washing waste liquid of at least one washing liquid selected from the group consisting of water, the organic solvent and the mixed solution of water and the organic solvent which has been used for the washing treatment in "10. Washing step" and further for the washing waste liquid after the washing treatment is conducted by suitably combining the water washing, the organic solvent washing and the acid washing for reducing the secondarily produced alkali metal salt and oligomers. In addition, the liquid containing the organic amide solvent obtained in "9. Separation step" or the washing waste liquid obtained in "10. Washing step" may also be stored in a container separately provided to collectively conduct the treatment for the separated liquid with the aqueous oxidizing solution for it at an appropriate time.

The oxidizing solution used in the treatment for the separated liquid with the aqueous oxidizing solution is a solution with an oxidizing agent dissolved in water like that used in the treatment of the collected PAS with the aqueous oxidizing solution which has been described in detail in "11. Aqueous oxidizing solution treatment step". The oxidizing agent is particularly preferably hydrogen peroxide.

The amount of the aqueous oxidizing solution used in the treatment for the separated liquid with the aqueous oxidizing solution may be controlled by suitably adjusting the amount of the aqueous oxidizing solution and the concentration of the oxidizing agent in the aqueous oxidizing solution in such a manner that the concentration of the oxidizing agent in a mixed liquid of the separated liquid and the aqueous oxidizing solution amounts to 10 to 100,000 mg/L, preferably 20 to 70,000 mg/L, more preferably 50 to 20,000 mg/L when the aqueous oxidizing solution is added and mixed with the separated liquid. If the concentration of the oxidizing agent in the mixed liquid is too low, the contact treatment with the separated liquid cannot be sufficiently conducted, and so the effect to reduce offensive odor is not achieved. If the concentration of the oxidizing agent in the mixed liquid is too high on the other hand, the effect to reduce offensive odor is not improved, and a problem of generation of oxygen gas may be caused in some cases.

The aqueous oxidizing solution used in the treatment for the separated liquid with the aqueous oxidizing solution is used in the form of an aqueous solution containing the oxidizing agent in a wide concentration range of 100 to 900,000 mg/L, preferably 1,000 to 600,000 mg/L, more preferably 2,000 to 400,000 mg/L. If the concentration of the oxidizing agent is too low, the effect to reduce offensive odor becomes insufficient, so that the amount of the aqueous oxidizing solution added to the separated liquid is increased to involve a problem that a large-scale container is required. If the concentration of the oxidizing agent is too high on the other hand, the effect to reduce offensive odor is not improved, and it is difficult to finely adjust the amount of the aqueous oxidizing solution added for controlling the concentration of the oxidizing agent in the mixed liquid with the separated liquid to the desired value described above.

For example, when the aqueous oxidizing solution is aqueous hydrogen peroxide, aqueous hydrogen peroxide whose hydrogen peroxide concentration is 1 to 60% by mass, preferably 2 to 40% by mass, more preferably 5 to 20% by mass can be used because the solubility of hydrogen peroxide in water is infinite. Commercially available aqueous hydrogen peroxide may be used as it is, or such a solution may also be diluted with water to a proper concentration prior to the addition to the separated liquid.

No particular limitation is imposed on a temperature upon the treatment for the separated liquid with the aqueous oxidizing solution. However, it is preferably ordinary temperature (10 to 40° C.).

No particular limitation is imposed on conditions upon the treatment for the separated liquid with the aqueous oxidizing solution, and the treatment is preferably conducted generally with a neutral solution. However, the treatment may also be conducted with a weakly acidic solution such as aqueous hydrogen peroxide or an alkaline solution.

The time of the treatment for the separated liquid with the aqueous oxidizing solution is from 1 minute to 3 hours. If the treatment time is too short, the effect to reduce offensive odor becomes insufficient. If the treatment time is too long on the other hand, the effect to reduce offensive odor is not improved. Thus, the treatment time is preferably from 3 minutes to 2 hours, particularly preferably from 5 minutes to 1 hour.

14. Poly(Arylene Sulfide)

The PAS obtained by the production process of the PAS according to the present invention is extremely low in the content of an odorous component. With respect of the contents of odorous components in the PAS, for example, the content of mesityl oxide that is an odorous component can be reduced to 65 ppm (mg/kg-PAS) or less, preferably 50 ppm or less, more preferably 30 ppm or less, particularly preferably 20 ppm or less, the content of diacetone alcohol can be likewise reduced to 35 ppm or less, preferably 30 ppm or less, more preferably 25 ppm or less, and the content of a dihaloaromatic compound can be likewise reduced to 110 ppm or less, more preferably 100 ppm or less, particularly preferably 80 ppm or less. When mesityl oxide and diacetone alcohol are contained as odorous components in the PAS, the total content thereof in the PAS can be reduced to 100 ppm or less, preferably 70 ppm or less, more preferably 60 ppm or less, still more preferably 50 ppm or less.

When the PAS obtained by the production process of the PAS according to the present invention is a polymer obtained by using p-dichlorobenzene (hereinafter abbreviated as "p-DCB") as the dihalo-aromatic compound, the content of p-DCB remaining in the polymer can be reduced to generally 110 ppm or less, preferably 100 ppm or less, more preferably 75 ppm or less, particularly preferably 50 ppm or less.

According to the production process of the present invention, a PAS having a melt viscosity of generally 1 to 100 Pa·s, preferably 2 to 80 Pa·s, particularly preferably 3 to 70 Pa·s as measured at a temperature of 310° C. and a shear rate of 1,216 $sec^{-1}$ can be obtained. According to the production process of the present invention, a PAS having a mass-average molecular weight (Mw) of generally 10,000 to 300,000, preferably 13,000 to 200,000, particularly preferably 14,000 to 100,000 can be obtained.

According to the production process of the present invention, a granular polymer captured on a screen having a sieve opening size of 150 μm (100 mesh) can be collected at a yield of generally 80 to 98%, preferably 83 to 97%, particularly preferably 85 to 95% after drying. According to the production process of the present invention, a granular PAS having an average particle diameter of 50 to 1,000 μm, preferably 70 to 800 μm, more preferably 200 to 700 μm can be obtained. In addition, according to the production process of the present invention, a granular PAS having a specific surface area of 0.1 to 500 $m^2/g$, preferably 1 to 200 $m^2/g$, more preferably 3 to 80 $m^2/g$ as measured by the BET method by nitrogen adsorption can be obtained, so that a granular PAS which is good in cleanability and excellent in handling property in the form of granules is provided.

EXAMPLES

The present invention will hereinafter be described more specifically by Example and Comparative Examples. However, the present invention is not limited to these examples alone. Testing or evaluating methods of physical properties and properties or characteristics are as follows.

(1) Sensory Test

The offensive odor of a PAS polymer and a separated liquid was judged by 3 inspectors according to "the six-grade odor intensity measurement method" and rated as "no odor being sensed" when all the inspectors judge them to be any of "0: odorless", "1: barely sensible" and "2: weak odor that the origin of the odor is known" or as "odor being sensed" when judged to be any other case than these.

(2) Odorous Component

Determination of an odorous component was conducted by using a PAS polymer after drying obtained in "12. Formed polymer collecting step" and measuring remaining amounts of mesityl oxide and diacetone alcohol that are substances developing strong odor and a p-DCB that is a raw material for reaction by gas chromatography (hereinafter abbreviated as GC).

<Conditions of GC Analysis>

Apparatus: G-3000 manufactured by Hitachi, Ltd.
Detector: FID (hydrogen flame ionization detector), 230° C.,
Temperature of vaporizing chamber: 200° C.,
Column: DB-WAX, 0.53 mm in diameter×15 m, film thickness=1.0 μm,
Column temperature: 80° C. (1 minute) and 220° C. (1 minute) raised to 220° C. at a heating rate of 10° C./min,
Carrier gas: helium, 4.7 ml/min (10 kPa), and
Amount of sample: 24

Incidentally, respective values were determined from calibration curves using commercially available mesityl oxide, diacetone alcohol and p-DCB.

(3) Melt Viscosity

A melt viscosity was measured by means of CAPIROGRAPH 1-C (trade mark) manufactured by Toyo Seiki Seisaku-sho, Ltd. using about 20 g of a dry polymer. A flat die of 1 mm in diameter×10 mm in length was used as a capillary, and the temperature was set to 310° C. After the polymer sample was placed in the apparatus and held for 5 minutes, the melt viscosity was measured at a shear rate of 1,216 sec$^{-1}$.

(4) Mass-Average Molecular Weight

The mass-average molecular weight (Mw) of a polymer was measured under the following conditions by using a high-temperature gel permeation chromatograph (GPC) SSC-7000 manufactured by Senshu Scientific Co., Ltd. The mass-average molecular weight was calculated out as a value converted from polystyrene.

Solvent: 1-chloronaphthalene,
Temperature: 210° C.,
Detector: UV detector (360 nm),
Amount of sample poured: 200 µl (concentration: 0.05% by mass),
Flow rate: 0.7 ml/min, and
Standard polystyrene: 5 standard polystyrenes of 616,000, 113,000, 26,000, 8,200 and 600.

(5) Average Particle Diameter

The average particle diameter of a polymer was measured by subjecting a dried polymer collected to a sifting method using sieves of mesh #7 (sieve opening size: 2,800 µm), mesh #12 (sieve opening size: 1,410 µm), mesh #16 (sieve opening size: 1,000 µm), mesh #24 (sieve opening size: 710 µm), mesh #32 (sieve opening size: 500 µm), mesh #60 (sieve opening size: 250 µm), mesh #100 (sieve opening size: 150 µm), mesh #145 (sieve opening size: 105 µm) and mesh #200 (sieve opening size: 75 µm).

(6) Specific Surface Area

The specific surface area of polymer particles was measured by using the following apparatus under the following conditions.
Apparatus: FLOWSORB II 2300 manufactured by Shimadzu Corporation,
Measurement: Determine a specific surface area by the BET method by nitrogen adsorption, and
Temperature: liquid nitrogen temperature.

Referential Example 1

Preparation of PPS

A 20-liter autoclave was charged with 6,004 g of N-methyl-2-pyrrolidone (hereinafter abbreviated as NMP), 2,000 g of an aqueous solution of sodium hydrosulfide (NaSH; concentration: 62% by mass, containing 28 g of Na$_2$S) and 1,191 g of sodium hydroxide (NaOH; concentration: 74% by mass). A molar ratio of sodium hydroxide/sulfur source (NaOH/S) was 0.997, and a molar ratio of NaOH/NaSH was 1.012. These sodium hydrosulfide and sodium hydroxide of the respective concentrations contain water such as water of hydration as a residual component.

After the interior of the autoclave was purged with nitrogen gas, the contents were gradually heated to 200° C. over about 4 hours while being stirred at 250 rpm by a stirrer to distill off 1,006 g of water (H$_2$O), 1,287 g of NMP and 12 g of hydrogen sulfide (H$_2$S) (Dehydration step).

After the dehydration step, the contents in the autoclave were cooled to 150° C., and 3,380 g of p-dichlorobenzene, 3,456 g of NMP, 19.29 g of sodium hydroxide (high-purity product) and 149 g of ion-exchanged water were added. A ratio (g/mol) of NMP/charged sulfur source (hereinafter abbreviated as "charged S") in the autoclave was 375, a ratio (mol/mol) of p-DCB/charged S was 1.060, a ratio (mol/mol) of H$_2$O/charged S was 1.50, and a ratio (mol/mol) of NaOH/charged S was 1.060.

While stirring the contents in the autoclave at 250 rpm by a stirrer, a reaction was conducted for 3 hours at a temperature of 220° C. to conduct first-stage polymerization.

After completion of the first-stage polymerization, the number of revolutions of the stirrer was increased to 400 rpm, and 444 g of ion-exchanged water was charged under pressure while continuing the stirring of the contents. A ratio (mol/mol) of H$_2$O/charged S was 2.63. After ion-exchanged water was charged under pressure, the contents were heated to 255° C. and reacted for 4 hours to conduct second-stage polymerization.

(Polymerization Step)

After completion of the second-stage polymerization, the contents were cooled near to room temperature and then sifted through a screen having a sieve opening size of 150 µm to separate and collect a polymer, thereby obtaining a wet cake (water content: 60% by mass). (Separation step)

A mixed solution of ion-exchanged water and acetone as a washing liquid was added to the polymer separated to wash the polymer while being stirred for 30 minutes. At this time, the amount of the washing liquid is 5 times as much as a theoretical amount of the polymer collected (an amount of the polymer in the wet cake), and the water content in the washing liquid is 5% by mass. After this washing was performed 2 times, washing with ion-exchanged water while being stirred was conducted 5 times each for 20 minutes. Each washing conducted above was performed by controlling the temperature of the washing liquid to room temperature. After the washing, the polymer was separated and collected to obtain a wet cake. (Washing step)

Example 1

One hundred grams of aqueous hydrogen peroxide having a concentration of 100 mg/L was added to 50 g of the wet cake (water content: 60% by mass) obtained in Referential Example 1 to treat the PPS with the aqueous hydrogen peroxide that is an aqueous oxidizing solution under conditions that stirring is conducted for 15 minutes at 30° C. (Aqueous oxidizing solution treatment step). The PPS subjected to the treatment with the aqueous hydrogen peroxide was washed with ion-exchanged water while being stirred 5 times each for 20 minutes. Thereafter, the polymer was separated by screening and then dried for 24 hours in a constant temperature oven controlled to 100° C. to obtain a PPS polymer (Formed polymer collecting step). The yield of the polymer thus obtained was 89%, and the polymer had an average particle diameter of 355 µm, a specific surface area of 38 m$^2$/g, a melt viscosity of 30 Pa·s, a mass-average molecular weight of 32,000 and was rated as "no odor being sensed".

Odorous components were extracted from the PPS after the drying and measured by GC. As a result, the total content of mesityl oxide and diacetone alcohol was 16 mg/kg-PPS (corresponding to 100 ppm or less), so that it was confirmed that the content of the odorous components remaining in the resin is reduced by the treatment with the aqueous oxidizing solution. In addition, it was confirmed that the remaining amount of p-DCB is also reduced. The results of the GC measurement are shown in Table 1.

Comparative Example 1

Fifty grams of the wet cake (water content: 60% by mass) obtained in Referential Example 1 was treated in the same manner as in Example 1 except that the aqueous hydrogen peroxide was not added. As a result, the resultant polymer was rated as "odor being sensed". The results of the GC measurement are shown in Table 1.

TABLE 1

| | Oxidizing agent | | Content of odorous component in PPS | | |
|---|---|---|---|---|---|
| | Kind | Concentration (mg/L) | Mesityl oxide (ppm) | Diacetone alcohol (ppm) | p-DCB (ppm) |
| Example 1 | Hydrogen peroxide | 100 | 4 | 12 | 72 |
| Comparative Example 1 | None | 0 | 75 | 39 | 128 |

Example 2

Investigation of Hydrogen Peroxide Concentration

PPSs of Example 2 were obtained in the same manner as in Example 1 except that the concentration of hydrogen peroxide in the aqueous hydrogen peroxide was changed. The resultant polymers were rated as "no odor being sensed". Odorous components were extracted from the resultant PPSs and measured by GC. As a result, it was confirmed that the content of the odorous components remaining in the resins is more reduced as the concentration of hydrogen peroxide increases. The results of the GC measurement are shown together with the results of Comparative Example 1 in Table 2.

TABLE 2

| | Content of odorous component in PPS | | |
|---|---|---|---|
| Oxidizing agent Hydrogen peroxide (mg/L) | Mesityl oxide (ppm) | Diacetone alcohol (ppm) | p-DCB (ppm) |
| Comparative Example 1 (re-shown) 0 | 75 | 39 | 128 |
| Example 2 50 | 18 | 34 | 99 |
| 100 | 4 | 12 | 72 |
| 500 | 2 | 10 | 53 |
| 1,000 | 1 | 9 | 46 |
| 5,000 | 0 | 9 | 9 |
| 10,000 | 0 | 9 | 0 |
| 50,000 | 0 | 8 | 0 |

Example 3 and Comparative Example 2

Investigation of Treatment Time

PPSs of Example 3 were obtained in the same manner as in Example 1 except that the time of the treatment with the aqueous hydrogen peroxide was changed. The resultant polymers were rated as "no odor being sensed". It is recognized that the content of the odorous components remaining in the resins is more reduced as the treatment time is elongated. The polymers of Comparative Example 2 in which the aqueous hydrogen peroxide was not added were rated as "odor being sensed". The results of the GC measurement in Example 3 and Comparative Example 2 are shown in Table 3.

TABLE 3

| | Oxidizing agent | | Content of odorous component in PPS | | |
|---|---|---|---|---|---|
| | Hydrogen peroxide (mg/L) | Washing time (min) | Mesityl oxide (ppm) | Diacetone alcohol (ppm) | p-DCB (ppm) |
| Example 3 | 100 | 1 | 62 | 35 | 107 |
| | | 5 | 13 | 21 | 96 |
| | | 15 | 4 | 12 | 72 |
| Comparative Example 2 | 0 | 0 | 74 | 43 | 149 |
| | | 1 | 75 | 42 | 132 |
| | | 5 | 77 | 44 | 127 |
| | | 15 | 75 | 39 | 128 |

Example 4

The wet cake separated and collected in the separation step of Referential Example 1 was subjected to a contact treatment with the aqueous hydrogen peroxide of Example 1 under conditions that stirring is conducted for 15 minutes at 30° C. without going through the washing step (Aqueous oxidizing solution treatment step). The PPS subjected to the treatment with the aqueous hydrogen peroxide was washed with ion-exchanged water while being stirred 5 times each for 20 minutes. Thereafter, the polymer was separated and collected by screening and then dried for 24 hours in a constant temperature oven controlled to 100° C. The PPS after the drying was rated as "no odor being sensed". Odorous components were extracted from this PPS and measured by GC. As a result, the content of mesityl oxide was 27 ppm, and the content of diacetone alcohol was 31 ppm, so that it was confirmed that the content of the odorous components remaining in the polymer is reduced. In addition, the content of p-DCB was also reduced to 98 ppm.

Example 5 and Comparative Example 3

One thousand grams of a liquid after the polymer is separated from the liquid reaction mixture in the separation step of Referential Example 1 and 500 g of a washing waste liquid obtained after the polymer is washed with the mixed solution of ion-exchanged water and acetone in the washing step were put together and recovered as a separated liquid used in Example 5. The content of acetone in the separated liquid was 20% by mass, and GC measurement revealed that the contents of mesityl oxide, diacetone alcohol and p-DCB are 224 ppm, 229 ppm and 63 ppm, respectively. Aqueous hydrogen peroxide having a concentration of 10% by mass was added to this separated liquid until the concentration of hydrogen peroxide in the separated liquid amounted to 100 mg/L, and the resultant mixture was stirred for about 3 minutes at 30° C. and then left at rest to treat the separated liquid for 1 hour in total (Separated liquid-treating step). As a result, odor intensity of the separated liquid was lowered compared with before the treatment. The results of the GC measurement are shown together with the results of Comparative Example 3 in which the aqueous hydrogen peroxide was not added in Table 4.

TABLE 4

| | Oxidizing agent | | Content of odorous component in PPS | | |
|---|---|---|---|---|---|
| | Kind | Concentration (mg/L) | Mesityl oxide (ppm) | Diacetone alcohol (ppm) | p-DCB (ppm) |
| Example 5 | Hydrogen peroxide | 100 | 165 | 124 | 49 |
| Comparative Example 3 | None | 0 | 224 | 229 | 63 |

INDUSTRIAL APPLICABILITY

According to the production process of the poly(arylene sulfide) of the present invention, an odor-causing substance remaining or produced when the poly(arylene sulfide) is polymerized or washed and collected can be removed to a low level. As a result, the occurrence of offensive odor upon the production of the poly(arylene sulfide) and upon the molding or forming and processing thereof at a high temperature can be reduced, so that the poly(arylene sulfide) obtained by the production process according to the present invention is suitable for application to general melt processing processes such as extrusion, injection molding and compression molding and can be suitably utilized in a wide variety of fields such as electrical and electronic equipments and automotive equipments, including sealing compounds and covering materials for electronic parts.

In addition, according to the production process of the poly(arylene sulfide) of the present invention, offensive odor of a liquid after the PAS is separated from the liquid reaction mixture containing the polymer formed and a washing waste liquid after the poly(arylene sulfide) is washed with an organic solvent can be reduced. As a result, lots of time and labor are not required for a deodorizing treatment for such a liquid to promote the recycling use of the organic solvent, etc., whereby the present invention can also contribute to solution of resources and environment problems and has high industrial availability.

The invention claimed is:

1. A production process of a poly(arylene sulfide), comprising the following steps (a), (b) and (d) or (a) to (d):
   (a) a polymerization step of subjecting at least one sulfur source selected from the group consisting of alkali metal sulfides and alkali metal hydrosulfides and a dihalo-aromatic compound to a polymerization reaction in an organic amide solvent to form a polymer;
   (b) a separation step of separating and collecting the polymer from a liquid reaction mixture containing the polymer formed after the polymerization step;
   (c) a washing step of washing the polymer collected with at least one washing liquid selected from the group consisting of water, an organic solvent and a mixed solution of water and an organic solvent and then separating and collecting the polymer; and
   (d) an aqueous oxidizing solution treatment step of treating the polymer collected by bringing the polymer into contact with an aqueous oxidizing solution, wherein
   the aqueous oxidizing solution is a solution with an oxidizing agent dissolved in water, and wherein the oxidizing agent is selected from the group consisting of potassium persulfate, potassium permanganate, sodium hypochlorite, peracetic acid, perbenzoic acid, hydrogen peroxide, and ozone.

2. The production process according to claim 1, which further comprises
   (e) a separated liquid-treating step of treating at least one separated liquid selected from the group consisting of a liquid after the polymer is separated from the liquid reaction mixture in the separation step and a washing waste liquid after the polymer is separated in the washing step by bringing the liquid into contact with an aqueous oxidizing solution.

3. The production process according to claim 1, wherein the aqueous oxidizing solution is aqueous hydrogen peroxide.

4. The production process according to claim 3, wherein the amount of hydrogen peroxide is 0.005 to 50 parts by mass per 100 parts by mass of the poly(arylene sulfide).

5. The production process according to claim 1, wherein the organic solvent includes acetone.

6. The production process according to claim 1, wherein the polymerization step is at least two-stage polymerization steps comprising:
   a first-stage polymerization step of subjecting at least one sulfur source selected from the group consisting of the alkali metal sulfides and the alkali metal hydrosulfides and the dihalo-aromatic compound to a polymerization reaction in the organic amide solvent to form a polymer in which a conversion of the dihalo-aromatic compound is 80 to 99%; and
   a second-stage polymerization step of continuing the polymerization reaction in the presence of the phase separation agent in a phase-separated state that a concentrated formed polymer phase and a dilute formed polymer phase are present in a mixed state within the polymerization reaction system.

7. The production process of the poly(arylene sulfide) according to claim 1, wherein the polymerization step is at least two-stage polymerization steps comprising:
   a first-stage polymerization step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent in a state that water is present in a proportion of 0.02 to 2.0 mol per mol of a charged sulfur source, thereby forming a polymer in which a conversion of the dihalo-aromatic compound is 80 to 99%; and
   a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in a phase-separated state that a concentrated formed polymer phase and a dilute formed polymer phase are present in a mixed state within the polymerization reaction system.

8. The production process of the poly(arylene sulfide) according to claim 7, wherein in the second-stage polymerization step, the amount of water in the polymerization reaction system is controlled so as to bring about a state that water exists in a proportion of from higher than 2.0 mol to not higher than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of 0.01 to 3 mol per mol of the charged sulfur source.

9. The production process of the poly(arylene sulfide) according to claim 1, wherein prior to the polymerization step, are arranged
   a dehydration step of heating and reacting a mixture containing the organic amide solvent, the sulfur source containing the alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system; and
   a charging step of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of the sulfur source existing in the system after the dehydration step, and the number of moles of water becomes 0.02 to 2.0 mol per mol of the charged sulfur source.

10. The production process according to claim 2, wherein the aqueous oxidizing solution is aqueous hydrogen peroxide.

11. The production process according to claim 10, wherein the amount of hydrogen peroxide is 0.005 to 50 parts by mass per 100 parts by mass of the poly(arylene sulfide).

12. The production process according to claim 2, wherein the organic solvent includes acetone.

13. The production process according to claim 2, wherein the polymerization step is at least two-stage polymerization steps comprising:
   a first-stage polymerization step of subjecting at least one sulfur source selected from the group consisting of the alkali metal sulfides and the alkali metal hydrosulfides and the dihalo-aromatic compound to a polymerization reaction in the organic amide solvent to form a polymer in which a conversion of the dihalo-aromatic compound is 80 to 99%; and
   a second-stage polymerization step of continuing the polymerization reaction in the presence of the phase separation agent in a phase-separated state that a concentrated formed polymer phase and a dilute formed polymer phase are present in a mixed state within the polymerization reaction system.

14. The production process of the poly(arylene sulfide) according to claim 2, wherein the polymerization step is at least two-stage polymerization steps comprising:
   a first-stage polymerization step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent in a state that water is present in a proportion of 0.02 to 2.0 mol per mol of a charged sulfur source, thereby forming a polymer in which a conversion of the dihalo-aromatic compound is 80 to 99%; and
   a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in a phase-separated state that a concentrated formed polymer phase and a dilute formed polymer phase are present in a mixed state within the polymerization reaction system.

15. The production process of the poly(arylene sulfide) according to claim 14, wherein in the second-stage polymerization step, the amount of water in the polymerization reaction system is controlled so as to bring about a state that water exists in a proportion of from higher than 2.0 mol to not higher than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of 0.01 to 3 mol per mol of the charged sulfur source.

16. The production process of the poly(arylene sulfide) according to claim 2, wherein prior to the polymerization step, are arranged
   a dehydration step of heating and reacting a mixture containing the organic amide solvent, the sulfur source containing the alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system; and
   a charging step of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of the sulfur source existing in the system after the dehydration step, and the number of moles of water becomes 0.02 to 2.0 mol per mol of the charged sulfur source.

* * * * *